(12) United States Patent
Kuybeda et al.

(10) Patent No.: US 10,511,793 B2
(45) Date of Patent: Dec. 17, 2019

(54) TECHNIQUES FOR CORRECTING FIXED PATTERN NOISE IN SHUTTERLESS FIR CAMERAS

(71) Applicant: Adasky, Ltd., Yokneam Illit (IL)

(72) Inventors: Oleg Kuybeda, Boyds, MD (US); Eyal Madar, Haifa (IL)

(73) Assignee: Adasky, Ltd., Yokneam Illit (IL)

( * ) Notice: Subject to any disclaimer, the term of this patent is extended or adjusted under 35 U.S.C. 154(b) by 0 days.

(21) Appl. No.: 16/021,779

(22) Filed: Jun. 28, 2018

(65) Prior Publication Data

US 2018/0376088 A1 Dec. 27, 2018

Related U.S. Application Data

(63) Continuation-in-part of application No. 15/989,779, filed on May 25, 2018.

(60) Provisional application No. 62/526,733, filed on Jun. 29, 2017, provisional application No. 62/515,200, filed on Jun. 5, 2017, provisional application No. 62/543,108, filed on Aug. 9, 2017, provisional application No. 62/552,620, filed on Aug. 31, 2017.

(51) Int. Cl.
*H04N 5/33* (2006.01)
*H04N 5/365* (2011.01)
*G01J 5/06* (2006.01)

(52) U.S. Cl.
CPC .............. *H04N 5/3651* (2013.01); *G01J 5/06* (2013.01); *H04N 5/33* (2013.01); *H04N 5/3656* (2013.01); *G01J 2005/068* (2013.01)

(58) Field of Classification Search
CPC .... H04N 5/33; H04N 5/2176; H04N 5/23229; H04N 5/243; H04N 5/3651; G06T 2207/10048; G06T 5/002; G06T 5/003; G06T 7/0002; G06T 7/20; G01J 2005/068; G01J 5/06; G05D 1/0242; G05D 2201/0213
USPC ........................................................ 348/164
See application file for complete search history.

(56) References Cited

U.S. PATENT DOCUMENTS

| | | |
|---|---|---|
| 5,053,870 A | 10/1991 | Ito et al. |
| 5,323,334 A | 6/1994 | Meyers et al. |
| 5,414,439 A | 5/1995 | Groves et al. |
| 6,759,949 B2 | 7/2004 | Miyahara |
| 7,199,366 B2 | 4/2007 | Hahn et al. |
| 7,683,321 B1 | 3/2010 | King et al. |
| 8,067,735 B2 | 11/2011 | King et al. |
| 8,208,026 B2 | 6/2012 | Högasten et al. |

(Continued)

OTHER PUBLICATIONS

International Search Report and Written Opinion of International Searching Authority for PCT/US2018/034620, ISA/RU, Moscow, Russia, dated Aug. 27, 2018.

(Continued)

*Primary Examiner* — Behrooz M Senfi
(74) *Attorney, Agent, or Firm* — M&B IP Analysts, LLC (57) ABSTRACT

A system and method for correcting fixed pattern noise in far-infrared (FIR) images captured by a shutterless FIR camera. The method includes: determining a drift coefficient based on previously determined calibration values and high pass filter values applied to an input FIR image captured by the shutterless FIR camera; smoothing the drift coefficient based, in part, on previously computed drift coefficient values; and removing noise from the input image based on the smoothed drift coefficient value.

23 Claims, 8 Drawing Sheets

(56) References Cited

U.S. PATENT DOCUMENTS

| | | |
|---|---|---|
| 8,378,290 B1 | 2/2013 | Speake et al. |
| 8,384,783 B2 | 2/2013 | Strandemar et al. |
| 8,503,821 B2 | 8/2013 | Hogasten |
| 8,562,776 B2 | 10/2013 | Liberman et al. |
| 9,143,703 B2 | 9/2015 | Boulanger et al. |
| 9,251,595 B2 | 2/2016 | Bailey et al. |
| 9,508,124 B2 | 11/2016 | Bailey et al. |
| 9,635,220 B2 | 4/2017 | Foi et al. |
| 9,681,066 B2 | 6/2017 | Strandemar |
| 2003/0007074 A1 | 1/2003 | Nagaoka et al. |
| 2006/0279632 A1 | 12/2006 | Anderson |
| 2008/0197284 A1 | 8/2008 | Ebenstein et al. |
| 2010/0111412 A1* | 5/2010 | Hogasten .......... G06T 5/50 382/167 |
| 2012/0312976 A1 | 12/2012 | Boulanger et al. |
| 2012/0320217 A1 | 12/2012 | Högasten |
| 2012/0321212 A1 | 12/2012 | Högasten et al. |
| 2013/0218500 A1 | 8/2013 | Durand et al. |
| 2014/0015921 A1 | 1/2014 | Foi et al. |
| 2014/0016879 A1 | 1/2014 | Högasten et al. |
| 2014/0037225 A1 | 2/2014 | Högasten et al. |
| 2014/0092257 A1 | 4/2014 | Hogasten et al. |
| 2014/0198218 A1* | 7/2014 | Afrooze .......... H04N 5/235 348/229.1 |
| 2014/0270563 A1* | 9/2014 | Bailey .......... G06T 5/005 382/254 |
| 2014/0354825 A1 | 12/2014 | Johansson et al. |
| 2014/0355904 A1 | 12/2014 | Olsson |
| 2015/0009335 A1 | 1/2015 | Strandemar |
| 2015/0226613 A1 | 8/2015 | Bauer et al. |
| 2015/0312488 A1 | 10/2015 | Kostrzewa et al. |
| 2015/0332441 A1 | 11/2015 | Högasten et al. |
| 2015/0350567 A1 | 12/2015 | Parrish et al. |
| 2015/0355026 A1 | 12/2015 | Iguchi et al. |
| 2016/0104048 A1 | 4/2016 | Stein et al. |
| 2016/0203694 A1 | 7/2016 | Högasten et al. |
| 2017/0262995 A1 | 9/2017 | Li et al. |

OTHER PUBLICATIONS

International Search Report and Written Opinion of International Searching Authority for PCT/US2018/039987, ISA/RU, Moscow, Russia, dated Oct. 16, 2018.

* cited by examiner

TECHNIQUES FOR CORRECTING FIXED PATTERN NOISE IN SHUTTERLESS FIR CAMERAS

CROSS-REFERENCE TO RELATED APPLICATIONS

This application claims the benefit of U.S. Provisional Application No. 62/526,733 filed on Jun. 29, 2017. This application is also a continuation-in-part (CIP) of U.S. patent application Ser. No. 15/989,779 filed on May 25, 2018, now pending. The Ser. No. 15/989,779 application claims priority to: U.S. Provisional Application No. 62/515,200 filed on Jun. 5, 2017; U.S. Provisional Application No. 62/543,108, filed on Aug. 9, 2017; U.S. Provisional Application No. 62/552,620, filed on Aug. 31, 2017; and the 62/526,733 Application, filed on Jun. 29, 2017. All of the applications referenced above are hereby incorporated by reference.

TECHNICAL FIELD

The present disclosure relates generally to automotive safety systems and, more specifically, to correcting fixed pattern noise in shutterless far-infrared (FIR) cameras utilized by such systems.

BACKGROUND

Thermal infrared (IR) cameras capture image wavelengths in the range of approximately seven to fourteen micrometers. A typical IR camera uses an infrared sensor (or detector) to detect infrared energy that is guided to the sensor through the camera's lens. IR cameras can be utilized for a variety of imaging applications including, but not limited to, passive motion detection, night vision, thermal mapping, health care, building inspection, surveillance, and the like. Recently, an attempt has been made in the IR industry to integrate IR cameras in advanced driver assistance systems (ADAS) and autonomous vehicle systems.

The application, and hence the type of camera, may depend on the infrared spectrum used. The infrared spectrum lies outside the visible light range and consists of a near infrared section (NIR), with wavelengths of 0.75-1.0 micrometers (μm); a short infrared section (SWIR) with wavelengths of 1.0-3.0 micrometers (μm); a mid-infrared section (MIR), with wavelengths of 3.0-5.0 μm; and a far-infrared (FIR) section, with wavelengths of 7.0-14.0 μm.

One type of FIR sensor is an uncooled sensor having a small form factor. Such sensors can typically be mass-produced using low-cost technology. In a typical arrangement, an uncooled sensor does not require a cryocooler for proper operation, but does require a shutter for frequent calibration. A shutter is a mechanical element placed between the lens and the FIR sensor for alternately blocking and exposing the sensor to infrared wavelengths. Generally, a shutter includes a flat-bladed flag, a sleeve, and an arm that connects the sleeve to the flag. The flag opens and closes at predefined time intervals.

Each detector within an FIR sensor may be configured to be sensitive to temperature changes that may result either from thermal radiation of the outside scene, i.e., the image of interest, or from the internal, or ambient, camera radiation, causing parasitic ambient drift. Since each detector has a slightly different responsivity to ambient temperature, the ambient drift pattern adds a random offset to each pixel that persists between different video frames and changes as a function of ambient temperature. Ambient drift removal is one of the crucial steps in proper image processing of thermal cameras.

The shutter is used during a flat-field correction (FFC) process to address this ambient drift. In an FFC process, the shutter presents a uniform temperature source to the FIR sensor. While imaging the flat-field source, the camera updates the offset correction coefficients, resulting in a more uniform image after the process is completed. The duration of the FFC process lasts a few hundred milliseconds, during which the image captured just prior to the shutter blocking the field of view is frozen until the FFC process is completed, when the shutter is reopened. This process must occur every few minutes for proper calibration.

While using a shutter may improve the quality and accuracy of the thermal image captured by an FIR sensor, having a blackout period lasting hundreds of milliseconds is unacceptable in certain applications. For example, using a shutter-based FIR camera in advanced driver assistance systems and autonomous vehicle systems can pose a high risk, as the camera must frequently shut off for an unacceptable amount of down time for driving situations. In addition, shutters include moving parts that wear out over time. This may cause a camera to malfunction during use and shorten the life of the camera.

The FIR camera designed for advanced driver assistance systems and autonomous vehicle systems should meet additional constraints other than safety. Such constraints include a small form factor, accurate and low latency image processing, and low-power consumption. As such, currently available FIR cameras, and in particular shutter-based FIR cameras, are not well adapted for automotive applications, as the presence of a shutter requires a larger camera body and additional energy to power the shutter movement.

While there are manufacturers who produce shutterless cameras where the ambient drift pattern is initially calculated during the camera manufacturing process, basing the correction merely on calibration performed during the manufacturing process often leads to inaccurate results. This is because the output of an FIR sensor, and hence the camera, depends on the current internal (ambient) camera radiation, also known as parasitic ambient drift. Without properly rectifying this ambient drift, the output image includes a residual unwanted noise pattern.

It would therefore be advantageous to provide a solution to correct fixed pattern noises including ambient drift in shutterless FIR cameras.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for correcting fixed pattern noise in far-infrared (FIR) images captured by a shutterless FIR camera, including: determining a drift coefficient based on previously determined calibration values and high pass filter values applied to an input FIR image captured by the shutterless FIR camera; smoothing the drift coefficient based, in part, on previously computed drift coefficient values; and removing noise from the input image based on the smoothed drift coefficient value.

Certain embodiments disclosed herein also include a non-transitory computer readable medium having stored thereon instructions for causing a processing circuitry to perform a process, the process including: determining a drift coefficient based on previously determined calibration values and high pass filter values applied to an input FIR image captured by the shutterless FIR camera; smoothing the drift coefficient based, in part, on previously computed drift coefficient values; and removing noise from the input image based on the smoothed drift coefficient value.

Certain embodiments disclosed herein also include an electronic circuit integrated in a shutterless far-infrared (FIR) camera and configured to process FIR images, including: a processing circuitry; and a memory containing instructions that, when executed by the processing circuitry, configure the processing circuitry to: determine a drift coefficient based on previously determined calibration values and high pass filter values applied to an input FIR image captured by the shutterless FIR camera; smooth the drift coefficient based, in part, on previously computed drift coefficient values; and remove noise from the input image based on the smoothed drift coefficient value.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example to the disclosed embodiments of techniques for correcting fixed pattern noise (FPN), including ambient drift corrections, a shutterless far-infrared (FIR) camera is provided. In shutter-based cameras, an FPN correction is based on a 2-point correction, which requires knowledge of non-uniform pixel gains (obtained during camera calibration) and offsets (obtained by using a shutter having a uniform temperature). According to the disclosed embodiments, no shutter is used. To this end, the FPN correction is performed by representing offsets as a sum of a drift pattern with intensity changing as a function of the ambient camera temperature, and a fixed offset. The drift, offset and gain patterns are obtained during camera calibration. Further, to perform online correction, the drift contribution is estimated and removed from the image.

Figure 1:
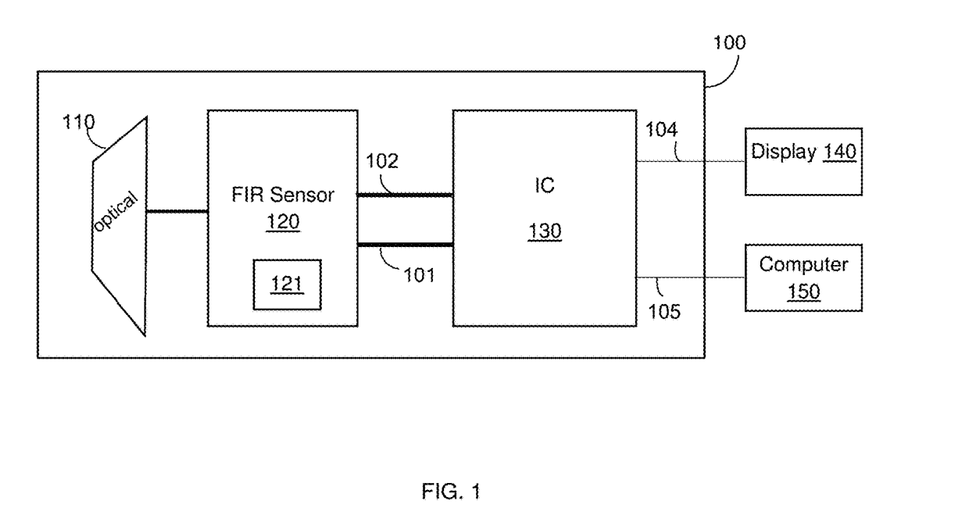
FIG. 1 is a block diagram of an FIR camera structured according to one embodiment.

FIG. 1 shows an example block diagram of an FIR camera 100 utilized to described the various disclosed embodiments. The FIR camera 100 includes an optical unit 110 and an FIR sensor 120 coupled to an integrated circuit (IC) 130. The output of the FIR camera 100 is a video stream of thermal images (thermal video stream) captured by the FIR sensor 120 and processed by the IC 130.

In a configuration, two thermal video streams are output by the FIR camera 100. A first stream 104 includes thermal images captured by the FIR sensor 120 and processed by the IC 130 for the shutterless correction and image enhancement. In an example, the first thermal video stream 104 is an 8-bit grayscale video stream. The first thermal video stream 104 is fed to a display 140 which may be a screen on a dashboard of a vehicle.

A second thermal video stream 105 is captured by the FIR sensor 120 and processed by the IC 130 for at least shutterless correction. In an example, the second thermal video stream 105 is a 14-bit data stream that is fed to a computer 150 for computer vision processing. Specifically, the computer 150 may be configured to execute various computer vision algorithms related to advanced driver assistance and autonomous vehicle systems and applications. The algorithms may include, but are not limited to, detection of objects, obstacles, or hazards on a road. For example, the processed thermal video stream as output by the FIR camera 100 can be utilized for the detection of vehicles, pedestrians, animals, two-wheelers, black-ice spots, litter, debris, potholes, gully covers, curbs and so on. In an embodiment, the computer 150 may be an onboard vehicle computer or a dedicated computer installed in the vehicle (not shown). In some example embodiments, the computer may be a virtual or physical computing machine operable in a cloud computing platform (not shown).

As will be discussed below, the processing performed by the IC 130 enhances the quality of the captured thermal images to allow for the accurate and fast detection of objects, obstacles and hazards on the road. The processing by the IC 130 ensures passive detection of objects during daytime and nighttime in all weather conditions. To this end, the IC 130 is configured to perform one or more image processing tasks. One such task includes, but is not limited to, shutterless correction of the captured FIR thermal images captured by the FIR sensor 120, and specifically correction of fixed pattern noise due to ambient drift.

As demonstrated in FIG. 1, the FIR camera 100 does not include a shutter (or any moving part that can be viewed as shutter). The shutterless correction executed by the IC 130 allows for the performance of a flat-field correction without a shutter. That is, shutterless correction allows for an FIR image unwanted fixed pattern noise removed therefrom.

It should be appreciated that the shutterless FIR camera 100 is mechanically reliable and meets safety standards required for advanced driver assistance and autonomous vehicle systems. Further, the absence of a shutter allows for an FIR camera design with a small form factor, as well as mechanical failure safety, as there is no need to include moving parts in the design.

In one configuration, the optical unit 110 includes one or more lens elements, each of which having a predetermined field of view (FOV). In an embodiment, the lens elements are chalcogenide. The lens may be protected by a protective window (not show in FIG. 1). Further, to prevent icing of the optical unit 110 it may be covered by a heating means (not shown in FIG. 1). The heating means may include a wire or a coil.

The FIR sensor 120 is an uncooled FIR sensor. That is, the sensor 120 operates in the FIR (far-infrared) spectrum with an approximate wavelength of 7.0 μm-14.0 μm. In an example configuration, the FIR sensor 120 is coupled through a first bus 101 to the IC 130 to input the captured FIR images and metadata. In an embodiment, a junction temperature sensor 121 is included in an enclosure of the FIR sensor 120 to measure the junction temperature therein.

A control bus 102 is also connected between the FIR sensor 120 and the IC 130. On the bus 102, signals related to the status of the sensor 120, clock, synchronization, and other digital control signals are transferred. In an embodiment, the bus 102 may carry analog signals indicating, for example, the current ambient temperature of the FIR sensor 120. Alternatively, the analog signal may not be part of the control bus 102.

The IC 130 includes a memory, a processing circuitry, and various circuits and modules allowing the execution of the tasks noted herein. A detailed block diagram of the IC 130 is provided in FIG. 2. The IC 130 may be realized as a chipset, a system on a chip (SoC), a field programmable gate array (FPGA), a programmable logic device (PLD), an application specific integrated circuit (ASIC) or any other type of digital and/or analog hardware components.

The IC 130, and hence the FIR camera 100, operates in four different modes: calibration, power-on-test, function, and standby. The calibration mode is performed at a lab where the IC 130 executes a calibration process based on previous calibration points. During the process, the FIR camera 100 is stabilized at a predefined temperature and the ambient temperature is periodically read from the FIR sensor 120 to determine temperature stability.

In the power-on-test mode, the FIR camera 100 is checked, during its power-up, if the various circuits of the IC 130 operate properly. This includes, for example, performing internal self-tests for memories, logic monitors, and digital and analog components. In the function mode, the IC 130 performs image processing tasks and communicates with external systems and components (e.g., a sensor and a computer), as explained herein. In the standby mode, no image processing is actively performed, but there is communication with external systems and components. The standby mode may be activated when the vehicle is not in motion or when the ADAS is not engaged.

The FIR sensor 120 and IC 130 are encapsulated in a thermal core. The thermal core is utilized to ensure a uniform temperature for the FIR camera 100. The temperature calibration of the thermal core is performed during the calibration mode. The optical unit 110 is typically assembled in the FIR camera 100 after the FIR sensor 120 and IC 130 are encapsulated in the thermal core.

Figure 2:
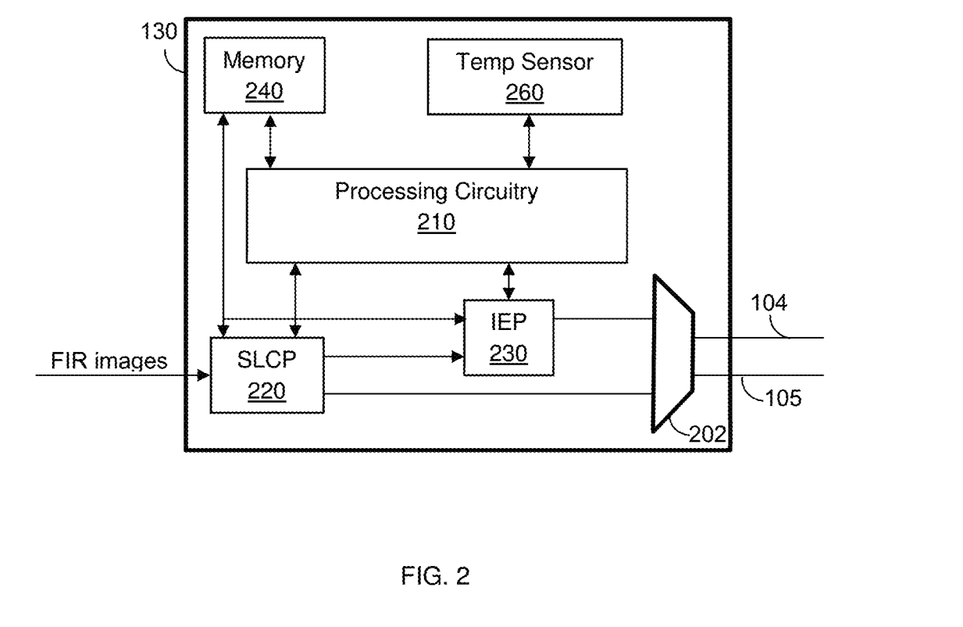
FIG. 2 is a block diagram of an IC integrated in the FIR camera of FIG. 1 according to an embodiment.

FIG. 2 shows an example block diagram of the IC 130 designed according to one embodiment. The IC 130 includes a processing circuitry 210, a shutterless correction processor (SLCP) 220 and an image enhancing processor (IEP) 230 that are configured to execute the various image processing tasks described herein. The IC 130 further includes a memory 240, and a temperature sensor 260.

The IC 130 interfaces with the external elements, such as the display 140 and computer 150 of FIG. 1, through a multimedia link 202. In an example embodiment, the media link is a gigabit multimedia serial link (GMSL). As noted above, the IC 130 can be configured to output two thermal video streams of FIR images: a first stream (104) is processed by the SLCP 220 and the IEP 230 and output to the display 140, and second stream (105) is processed by the SLCP 220 and output to the computer 150. Both thermal video streams are output via the multimedia link 202. In a further embodiment, a single thermal video stream is output to the computer 150. For example, certain autonomous vehicle systems may not include a display, and thus only require input from the thermal video stream to a computer 150.

In some optional embodiments, the IC 130 does not include the IEP 230. In such embodiments, shutterless correction is performed by the SLCP 220, and the output is fed to the computer 150. A configuration of the FIR camera 100 without the IEP 130 or with a single thermal video stream can be utilized in autonomous vehicle systems where a display may not be required.

In an embodiment, the memory 240 is configured to store calibration tables. The calibration tables include calibration values for each pixel computed in the lab. The calibration values may include gain and offset values calculated from two temperature points (T1, T2) for the purpose of overcoming the irregularities in the FIR sensor and unifying the pixels' response to IR radiation for a wide range of ambient temperatures. The calibration table also includes a drift value determined for each pixel at each temperature point during a calibration process. In an embodiment, the tables also store various parameter values to set the FIR camera 100.

The memory 240 may further store computer readable instructions to be executed by the processing circuitry 210, the SLCP 220 and the IEP 230. The computer readable instructions shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 210, the SLCP 220 and/or IEP 230, cause these processors to perform the various embodiments and tasks described herein. The memory 240 may be volatile (e.g., RAM, etc.), non-volatile (e.g., ROM, flash memory, etc.), or a combination thereof. The temperature sensor 260 measures the ambient temperature inside the enclosure of the FIR camera 100.

The processing circuitry 210 is configured to control the various elements of the IC 130. The processing circuitry 210 is further configured to power-up the FIR sensor 120, upload the initial calibration tables and set the FIR sensor 120, the SLCP 220, and the IEP 230 based on the parameter values in such tables. In an embodiment, the processing circuitry 210 periodically samples the temperature as measured by the temperature sensor 260 and/or the FIR sensor 121, and uploads a set of calibration tables from the memory 240 that includes calibration values for the measured temperature range. To allow for fast execution, some configuration tables can be uploaded in the background, i.e., during the processing of FIR images.

The SLCP 220 is configured to perform at least shutterless pixel-based corrections for ambient drift. The pixel-based correction corrects gain, offset, and drift for each pixel. The gain and offset of a pixel are corrected based on the respective values in the calibration table matching a respective temperature as measured by the temperature sensor 121 of the FIR sensor 120 (FIG. 1). This correction compensates for the irregularities in the sensor and unifies the pixels' response to IR radiation for a wide range of ambient temperatures. The drift correction includes adding drift correction to each of the pixels to compensate for ambient drift.

According to the embodiments, the drift correction is based on a temperature drift correction for each of the pixels in the images output by the FIR sensor. This may be necessary if the temperature values of the FIR camera 100 as a whole, and the FIR sensor 120 and IC 130 individually, may shift during operation.

In an embodiment, the drift correction is based on estimating a drift coefficient γ using a drift pattern recorded during the calibration stage of the FIR camera 100. In an embodiment, estimation of the drift coefficient γ is performed iteratively with small incremental updates based on each input image, so that any residual noise, or new noise if the ambient temperature changes, is detected and removed with each subsequent image.

The ambient drift of an input image is corrected using the estimated drift coefficient γ. A drift corrected image ($I_{out}$) can be represented as follows:

$$I_{out} = \frac{I_{in} - \gamma \cdot D - O}{G} \quad \text{Eq. 1}$$

where, is $I_{in}$ is the input image (produced by the FIR sensor 120); γ is the drift coefficient, which is the same for all pixels; 'D' is the drift pattern, unique per pixel; 'O' is an offset gain pattern; and 'G' is the scene gain pattern value, unique per pixel, where D, O and G values are determined during initial calibration of the FIR sensor 120.

In some configurations, the gain and offset are corrected prior to the drift correction, in which case such values are not required to estimate the drift coefficient γ. Thus, a more generalized version of the drift correction calculation uses a 2-point corrected input image ($I_{2pt}$), drift coefficient and the drift pattern from the calibration, and can be represented by the following equation:

$$I_{out} = I_{2pt} - \gamma \cdot \hat{D} \quad \text{Eq. 2}$$

In Equation 2, $\hat{D}$ is the value of the drift pattern (D) divided by the gain pattern (G).

The drift coefficient γ used for the correction is derived from the drift pattern from the initial calibration and the resulting pattern of drift within an input image after a high pass filter has been applied thereto.

A generalized equation for the drift coefficient is the quotient of the product of the drift pattern and the input image pixel values after applying a high pass filter thereto, and the product of the drift pattern and the drift pattern after applying a high pass filter thereto, represented by the following equation:

$$\gamma = \frac{\langle H_1(D), H_2(I_{in}) \rangle}{\langle H_1(D), H_2(D) \rangle} \quad \text{Eq. 3}$$

where $H_1$ and $H_2$ are pre-processing operators designed to minimize correlation between a clean image of the scene and the drift pattern. Without loss of generality, these operators may include high pass filtering and masking. An example of such operations, without loss of generality, can be $H_1$=identity map and $H_2$=a high-pass filter.

In Equation 3 (Eq. 3), γ is a scalar value obtained as a ratio of 2 inner products. Therefore, it is one value for all pixels at this stage. In an embodiment, the scalar value can be converted to a (slowly varying) value per pixel by using Eq. 3 on different segments of the image and interpolating results. An example for such an embodiment is discussed below.

It should be noted that each of the SLCP 220 and IEP 230 may be realized as one or more hardware logic components and circuits. For example, and without limitation, illustrative types of hardware logic components that can be used include FPGAs, ASICs, ASSPs, SOCs, general-purpose microprocessors, microcontrollers, DSPs, and the like, or any other hardware logic components that can perform calculations or other manipulations of information.

Figure 3:
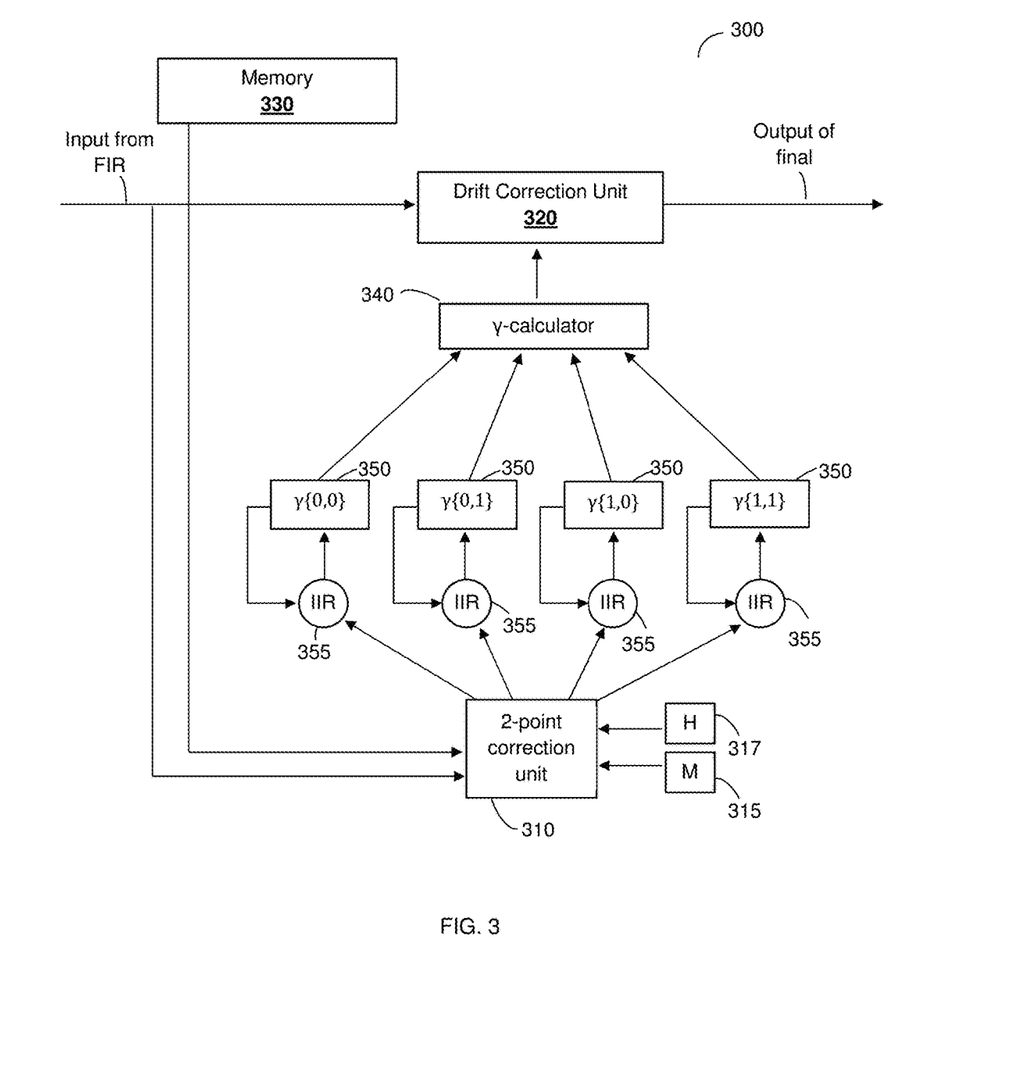
FIG. 3 shows a diagram of an embodiment of the technique for correcting ambient drift for a given input image.

FIG. 3 shows an example diagram of a pixel-based shutterless correction (PBSC) module 300 according to an embodiment. The PBSC module 300 may be one of the modules integrated in the SLCP 220.

In an embodiment, the PBSC module 300 includes a 2-point correction unit 310, a drift correction unit 320, and a memory 330. The memory 330 is configured to maintain at least scene gain pattern (G), reference point offset (O), and drift pattern (D) values associated with particular ambient temperatures or ranges of ambient temperatures. Such values are set during an initial calibration of the FIR camera 100.

In some embodiments, the memory 330 temporary stores only the G, O, and D values matching the current ambient temperature of the FIR sensor 120. In one embodiment, there may be multiple sets of G, O and D values, each associated with a specific range of ambient temperatures. For example, the memory may access and store the G, O, and D values for an ambient temperature between 15 and 25 degrees Celsius if an ambient temperature of 21 degrees Celsius is detected. The memory 330 may be, for example, the memory of the IC 130.

The 2-point correction unit 310 receives an input image $I_{in}$ from the FIR sensor and the scene gain pattern (G) values and reference point offset (O) values from the memory 330. Based on this input information, a 2-point correction is performed by the 2-points correction unit 310 by adding the reference point offset (O) value to the product of the scene gain pattern (G) values and an image output ($I_{2pt}$) value, and can be represented as follows:

$$I_{2pt} = G + O \quad \text{Eq. 4}$$

In some embodiments, the drift correction unit 310 is designed to ignore bad and/or saturated pixels. 'Bad pixels' are pixels within the image that are known a-priori to be defective or represent specific types of objects, such as strong edges, and saturated pixels are pixels exceeding a predefined value. These pixels can be removed from the calculation by applying a mask 315 to the image. In some embodiments, the mask 315 is applied to the image after the 2-point correction has been applied thereto. Additionally, a high-pass filter 317 is applied on the image and the drift gain value. The high pass filter 317 may be applied after the 2-point correction.

The drift correction unit 320 then corrects the fixed pattern noise caused due to unwanted ambient temperature drift. As discussed above, the drift correction is performed by estimating the drift coefficient γ, i.e., as applied in Equation 3. In some embodiments, the estimation is based on the image after the 2-point correction and drift pattern (D) values have been applied thereto. That is, an image output ($I_{out}$) by the drift correction unit 320 can be presented as follows:

$$I_{out} = I_{2pt} - \gamma \cdot D \quad \text{Eq. 5}$$

It should be noted that the equation to compute the drift coefficient γ can be applied locally for each pixel or more generally to a segment of pixels in the image. For example, the image can be split into multiple segments (e.g., the four segments represented by 350), where the equation is used to calculate the drift coefficient for a particular segment by preforming summations over pixels within that segment. Assuming the offset and gain are zero or have already been corrected, then γ can be computed for each segment as follows:

$$\gamma_{ij} = \frac{\Sigma_{ij} D_{ij} \cdot M_{ij} \cdot H(I_{in})_{ij}}{\Sigma_{ij} D_{ij} \cdot M_{ij} \cdot H(D)_{ij}} \quad \text{Eq. 6}$$

where D is a matrix representing the drift pattern values, M is a matrix representing the masked pixels, and H represents the application of the high pass filter. The 'ij' denotes the position of the pixel within the image. The summation is computed over pixels within the segment. An input image can be apportioned in any number of segments, where the summation calculates the drift coefficient for each such segment. The resulting $\gamma_{ij}$ values represent 'the amount of drift' measured in the center of the corresponding image segment. To obtain the γ measurement for each pixel, the corresponding γ value can be interpolated based on the pixel proximity to the center of its neighboring segments.

It should be further noted that the drift coefficient γ of each segment can be a blend of the calculated γ values of the current input image, and the previously calculated γ values. In an example embodiment, the blending of these coefficient values can be performed by a number of infinite impulse response (IIR) circuits 355 (e.g., equal to the number of segments). The IIR circuit's 355 smooth factor 'a' is a preconfigured value, and the blended γ value can be represented by the following equation:

$$\gamma_{n+1} = (1-\alpha) * \gamma_{current} + \alpha * \gamma_n \quad \text{Eq. 7}$$

Where $\gamma_{n+1}$ represents the blended output drift coefficient, α represents the preconfigured smooth factor, $\gamma_{current}$ represents current input image values and $\gamma_n$ represents the drift coefficient of a prior image. The drift coefficients of prior images may be stored in the memory 330 during each iteration of the calculation for future access for the determination of Equation 6.

It should be noted that the IIR circuits 355 perform exponential smoothing over the drift coefficient γ values to ensure removal of high frequency noise over a time period. The exponential smoothing format as provided in Equation 6 provides a smoothed statistic $\gamma_{n+1}$ which is a simple weighted average of the current calculated drift coefficients $\gamma_{current}$ and the previous smoothed statistic $\gamma_{n+1}$. In an example embodiment, the smoothing factor α is set to a value where $0.8 < \alpha < 0.95$.

The drift coefficient γ for each pixel is interpolated or otherwise extrapolated by the γ-calculator 340 from the different γ values calculated for each of the different segments. In some embodiments, this calculation is completed after the blended γ value is determined. The γ-calculator 340 lastly performs the final calculations using Equations 1, 3, and 5 referenced above. The final drift calculations are then applied to the input image via the drift correction unit 320.

It should be noted that each of the units in the PBSC module 300 may be realized as analog and/or more hardware logic components and circuits. For example, and without limitation, illustrative types of hardware logic components that can be used include FPGAs, ASICs, ASSPs, SOCs, general-purpose microprocessors, microcontrollers, DSPs, and the like, or any other hardware logic components that can perform calculations or other manipulations of information.

Figure 4:
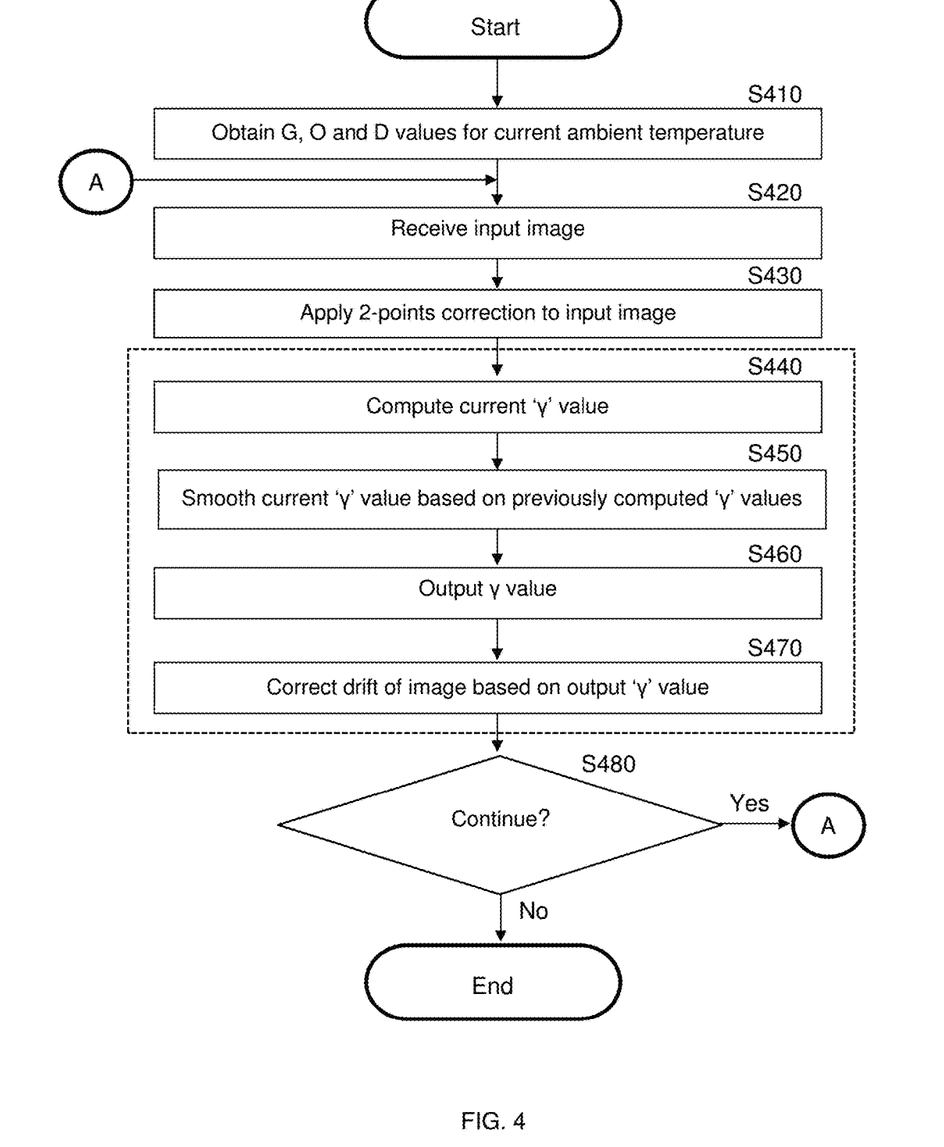
FIG. 4 shown an example flowchart illustrating a method for correcting ambient drift according to an embodiment.

FIG. 4 shows an example flowchart 400 illustrating a method for correcting fixed pattern noise according to an embodiment.

At S410, a sensor calibration table is accessed, where the calibration table includes predetermined adjustment values for each pixel of an FIR sensor. For example, the calibration table may include individual adjustment values for each pixel within an FIR sensor that are calculated when the FIR sensor is initially calibrated. These values may represent the amount of anticipated gain (G), offset (O), and drift (D) associated with each pixel under certain conditions, e.g. adjustment values that are associated with specific ambient temperatures. The calibration table may be stored on a memory or database that is remotely or locally accessible.

In some embodiments, there are certain gain, offset, and drift correction values associated with particular ambient temperatures or ambient temperature ranges. In such cases, only the relevant correction values need to be accessed at one time. Additionally, the ambient temperature can be evaluated at predetermined intervals. So long as the currently measured ambient temperature is within a single predefined temperature range, (e.g. 15-25 degrees Celsius), the same gain, offset, and drift values may be used. If the ambient temperature moves beyond that range, a new set of correction values can be accessed and implemented.

At S420, a thermal image is received from a FIR sensor, e.g. the FIR sensor 120 of FIG. 1.

At optional S430, a 2-point correction is applied to the input image. For example, the above referenced Equation 4 can be applied to the input image to determine the relevant gain and offset correction values. Alternatively, in some embodiments the fixed pattern noise can be corrected independent of the 2-point correction.

At S440, the current drift coefficient γ value is computed. Equation 3 more generally, and Equation 6 more specifically, can be applied to determine the correct drift coefficients for the pixels of the input image based on the G, O, and D values obtained in S420. Namely, Equation 6 may be applied when calculating a summation of the pixels within a segment of the image, and when applying a mask to pixels intended to be excluded from the calculated result. As discussed with regards to FIG. 3, the image may be split into multiple segments, where the drift coefficient is calculated independently for each segment.

At S450, the calculated γ value is adjusted by a smoothing process. The smoothing process may involve applying an exponential smoothing function using, for example, infinite impulse response (IIR) circuits on the calculated γ values of the current image with previously calculated γ values of prior input images. For example, as expanded upon with regards to FIG. 3, a number of IIR circuits may be employed to smooth the drift coefficient γ of the various segments to remove unwanted noise efficiently.

At S460, a drift coefficient γ value, per pixel, is determined, and applied to the input image at S470 to correct the drift gain from the image. If there are additional input images to correct (S480), the process returns to S420; otherwise, the process ends.

Figure 5:
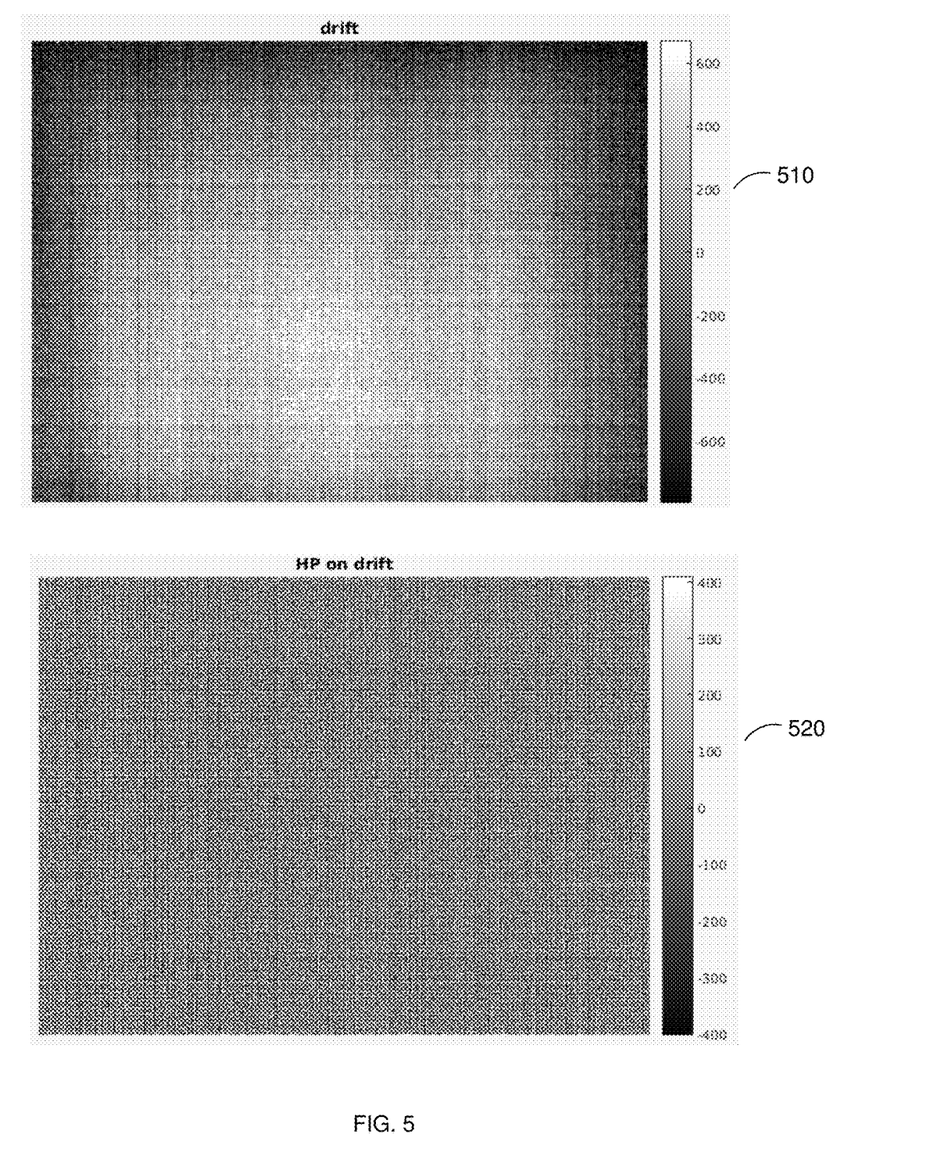
FIG. 5 show example screenshots of an ambient drift image before and after a high pass filter has been applied thereto.
Figure 6:
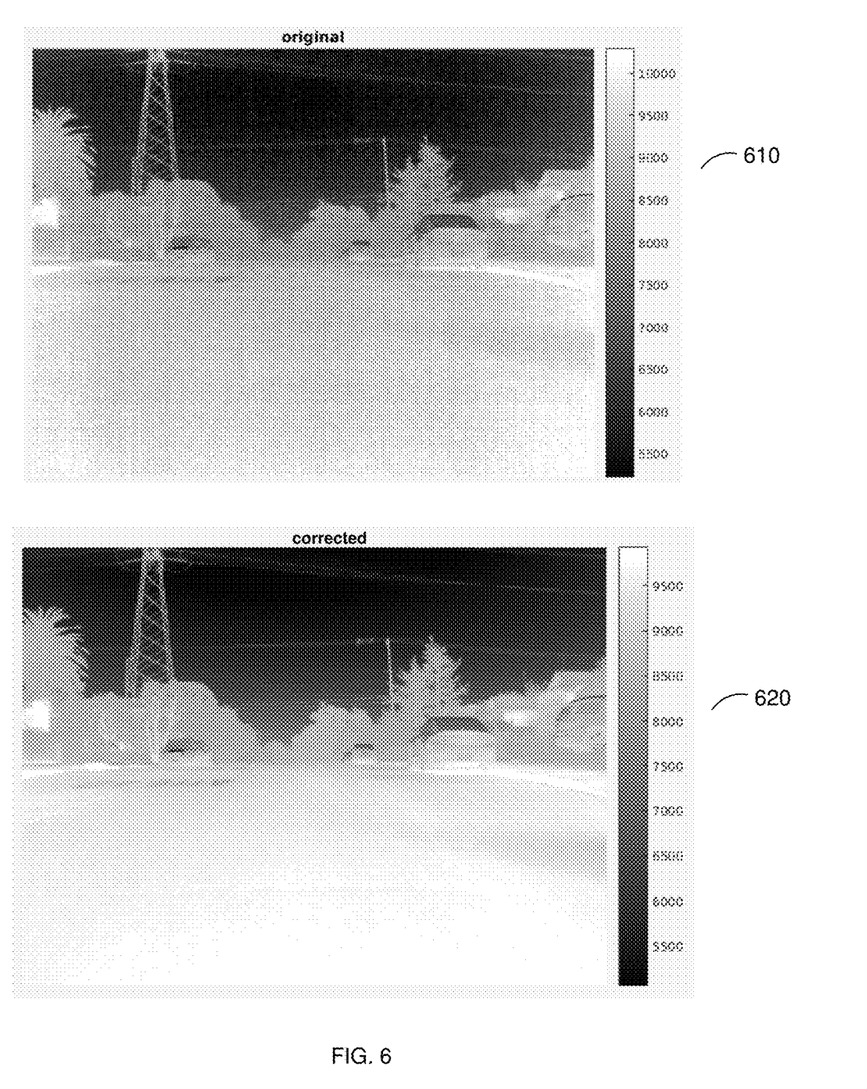
FIG. 6 shows example screenshots of an image before and after ambient drift corrections have been applied thereto using the disclosed method.
Figure 7A:
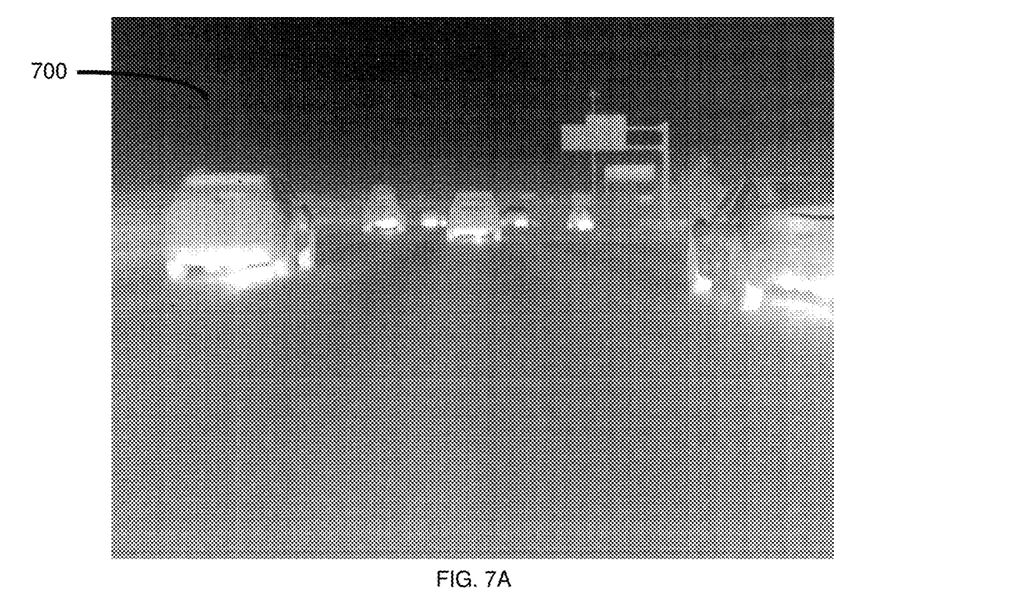
FIGS. 7A-7C show additional example screenshots of an input image, an image of gamma shift noise based on the input image, and a corrected output image.
Figure 7B:
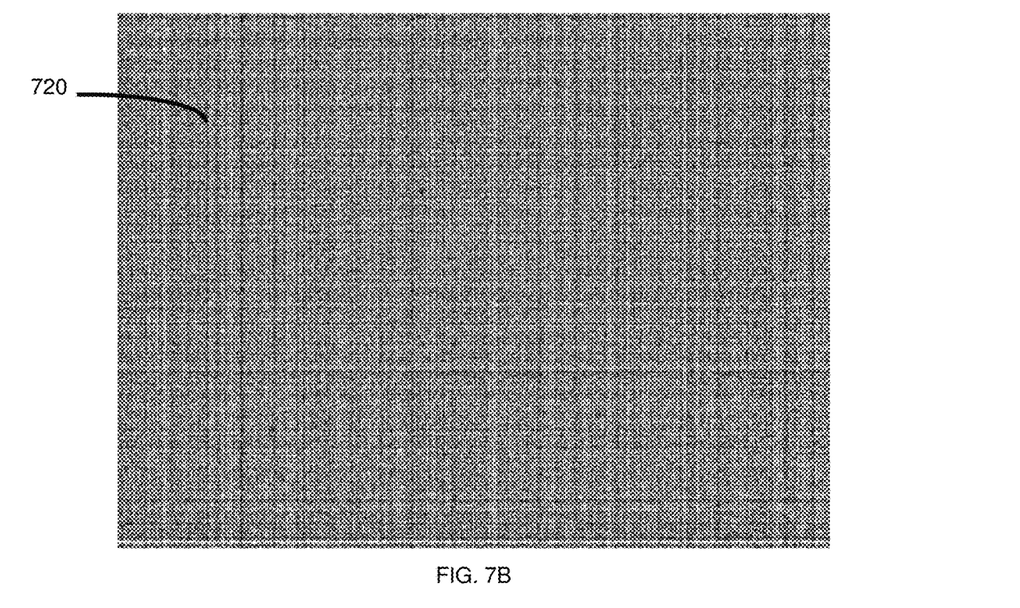
Figure 7C:
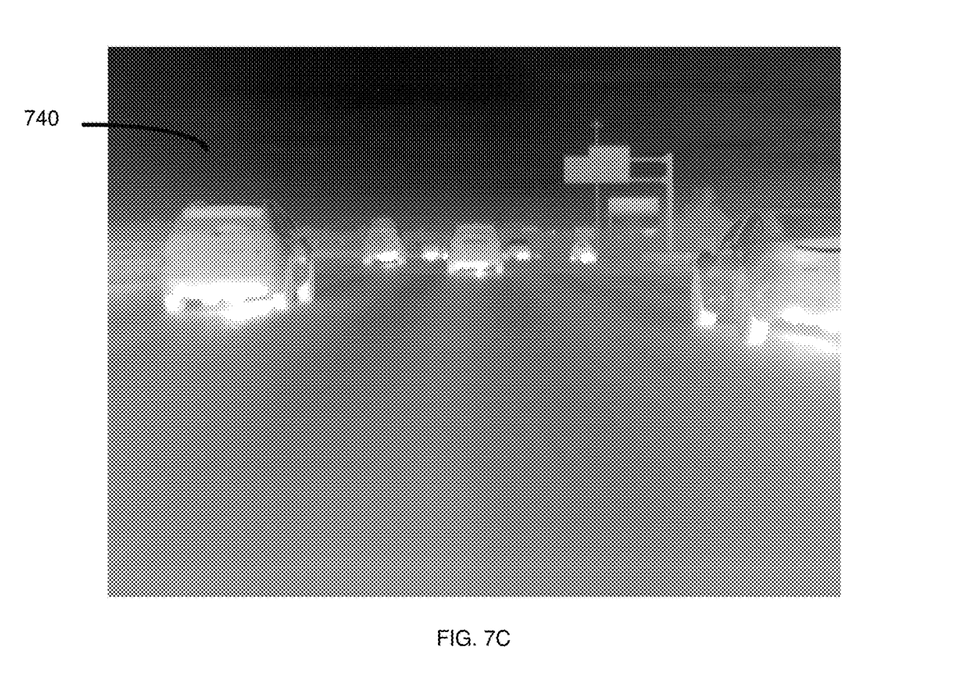

FIGS. 5, 6, and 7 show screenshots demonstrating the disclosed techniques in use.

FIG. 5 shows an example input image of gamma drift before 510 and after 520 a high pass filter has been applied thereto. Brighter spots within the frame of the image are smoothed out to prepare the image for effective drift correction.

FIG. 6 shows an example input image 610 and output image 620 after gamma drift adjustments have been applied thereto using the disclosed method. The original image 610 displays a street scene, where visible noise and artifacts can be seen covering the entirety of the frame. The corrected image 620 displays the same frame after the gamma drift correction has been applied thereto, where the visible noise has been effectively removed.

FIG. 7A shows an additional example of an input image 700. A road scene is shown, where visible noise and other artifacts are visible covering the entirety of the frame. FIG. 7B is an isolated frame of the noise resulting from a gamma shift within the original input image 700, as calculated via the present disclosure discussed herein. FIG. 7C shows the output image, which is the input after the removal of the noise frame shown in FIG. 7B.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for correcting fixed pattern noise in far-infrared (FIR) images captured by a shutterless FIR camera, comprising:
   determining a drift coefficient based on previously determined calibration values and high pass filter values applied to an input FIR image captured by the shutterless FIR camera, wherein the drift coefficient is based on current ambient temperature values;
   smoothing the drift coefficient based, in part, on previously computed drift coefficient values; and
   removing noise from the input image based on the smoothed drift coefficient value.

2. The method of claim 1, further comprising:
   applying a two-point correction to the input FIR image, wherein the two-point correction is based on previously determined reference point offset values and scene gain pattern values.

3. The method of claim 2, wherein the previously determined reference point offset values and the scene gain pattern values are associated with a predefined temperature range.

4. The method of claim 2, wherein the previously determined reference point offset values and the scene gain pattern values are determined for each pixel of the input image.

5. The method of claim 3, wherein the drift coefficient is based on previously determined calibration points associated with the predefined temperature range.

6. The method of claim 1, wherein the drift coefficient is iteratively updated based on previously corrected input images.

7. The method of claim 1, wherein the drift coefficient is determined locally for each pixel.

8. The method of claim 1, further comprising:
   dividing the input image into multiple segments, wherein the drift coefficient is determined for each of the multiple segments individually.

9. The method of claim 1, wherein the drift coefficient is based on the input image and on previously determined drift coefficient values for previous input images.

10. The method of claim 1, wherein smoothing the drift coefficient further comprises:
    weighting the average of the drift coefficient with previously smoothed drift coefficients.

11. The method of claim 1, wherein the shutterless FIR camera is mounted on a moving vehicle.

12. A non-transitory computer readable medium having stored thereon instructions for causing a processing circuitry to perform a process, the process comprising:
   determining a drift coefficient based on previously determined calibration values and high pass filter values applied to an input FIR image captured by the shutterless FIR camera, wherein the drift coefficient is based on current ambient temperature values;
   smoothing the drift coefficient based, in part, on previously computed drift coefficient values; and
   removing noise from the input image based on the smoothed drift coefficient value.

13. A electronic circuit integrated in a shutterless far-infrared (FIR) camera and configured to process FIR images, comprising:
   a processing circuitry; and
   a memory containing instructions that, when executed by the processing circuitry, configure the processing circuitry to:
   determine a drift coefficient based on previously determined calibration values and high pass filter values applied to an input FIR image captured by the shutterless FIR camera, wherein the drift coefficient is based on current ambient temperature values;
   smooth the drift coefficient based, in part, on previously computed drift coefficient values; and
   remove noise from the input image based on the smoothed drift coefficient value.

14. The electronic circuit of claim 13, wherein the processing circuitry is further configured to:
   apply a two-point correction to the input FIR image, wherein the two-point correction is based on previously determined reference point offset values and scene gain pattern values.

15. The method of claim 14, wherein the previously determined reference point offset values and the scene gain pattern values are associated with a predefined temperature range.

16. The method of claim 14, wherein the previously determined reference point offset values and the scene gain pattern values are determined for each pixel of the input image.

17. The method of claim 15, wherein the drift coefficient is based on previously determined calibration points associated with the predefined temperature range.

18. The method of claim 14, wherein the drift coefficient iteratively updated based on previously corrected input images.

19. The method of claim 14, wherein the drift coefficient is determined locally for each pixel.

20. The method of claim 14, wherein the processing circuitry is further configured to:
   divide the input image into multiple segments, wherein the drift coefficient is determined for each of the multiple segments individually.

21. The method of claim 14, wherein the drift coefficient is based on the input image and on previously determined drift coefficient values for previous input images.

22. The method of claim 14, wherein the processing circuitry is further configured to:
   weigh the average of the drift coefficient with previously smoothed drift coefficients.

23. The method of claim 14, wherein the shutterless FIR camera is mounted on a moving vehicle.

* * * * *